INVENTORS
Jerald D. Bidlack
Kenneth D. Garnjost
BY
Popp and Sommer
ATTORNEYS

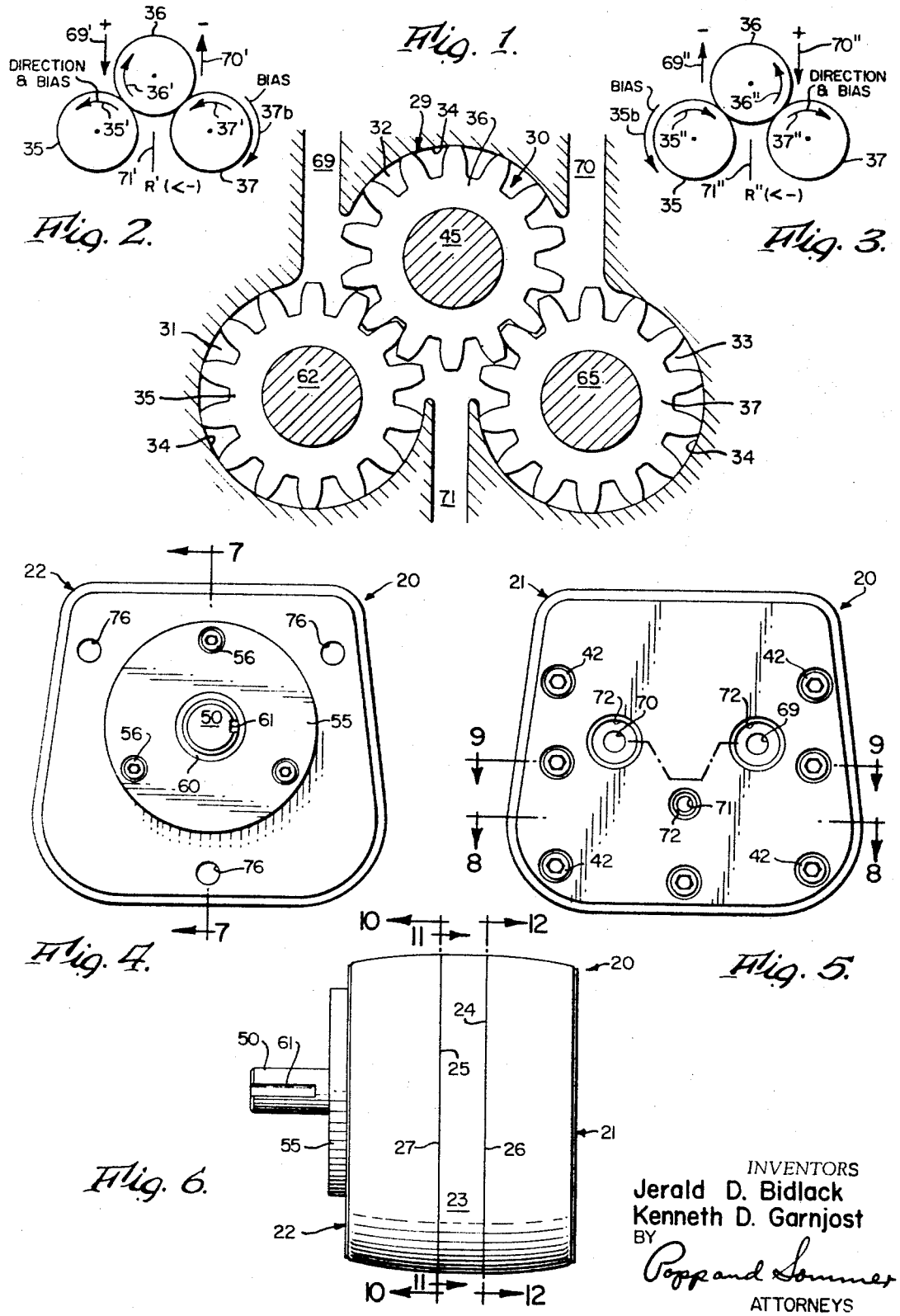

June 3, 1969    J. D. BIDLACK ET AL    3,447,422
ZERO BACKLASH FLUID MOTOR
Filed May 11, 1967    Sheet 3 of 4
Fig. 9.
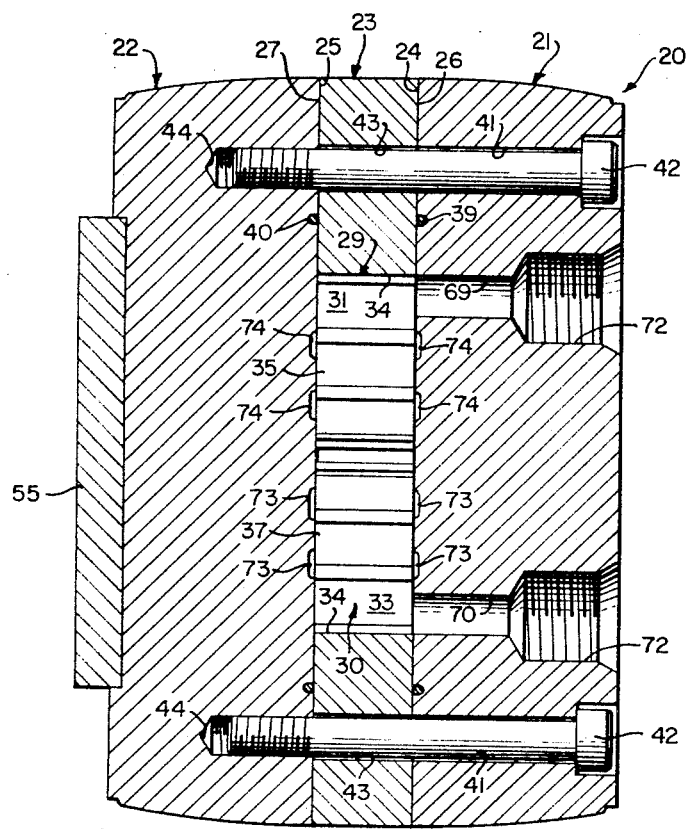
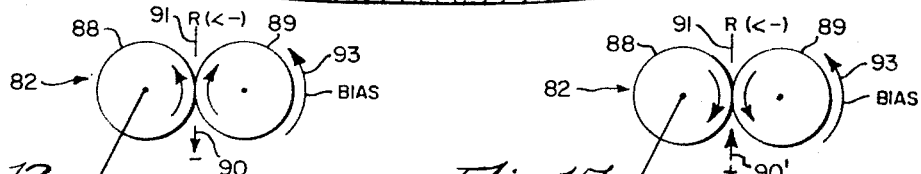
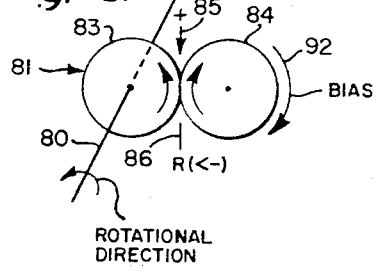
Fig. 13.
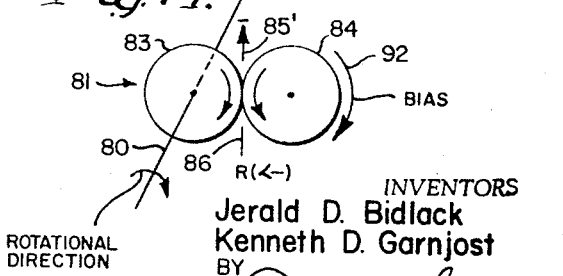
Fig. 14.
INVENTORS
Jerald D. Bidlack
Kenneth D. Garnjost
BY
Popp and Sommer
ATTORNEYS INVENTORS
Jerald D. Bidlack
Kenneth D. Garnjost
BY
Popp and Sommer
ATTORNEYS

United States Patent Office 3,447,422
Patented June 3, 1969

3,447,422
ZERO BACKLASH FLUID MOTOR
Jerald D. Bidlack, East Aurora, and Kenneth D. Garnjost, Buffalo, N.Y., assignors to Moog Inc., East Aurora, N.Y., a corporation of New York
Filed May 11, 1967, Ser. No. 637,819
Int. Cl. F01c 1/28
U.S. Cl. 91—89                                    15 Claims

ABSTRACT OF THE DISCLOSURE

A zero backlash fluid motor having contacting force transmitting elements such as gear teeth on rotary members such as gears which mesh and are biased or preloaded unidirectionally regardless of rotational direction or output torque loading.

BACKGROUND OF THE INVENTION

Heretofore fluid motors employing meshing gears or the like possessed backlash which evidenced itself when the rotational direction of the output shaft reversed or the torque loading on the shaft changed. This backlash was undesirable for precision drive such as in numerical control machine tools.

SUMMARY OF THE INVENTION

The present invention provides a zero backlash fluid motor having an output shaft, first fluid driven means biasing such shaft to rotate in one direction only, and second fluid driven means biasing such shaft to rotate in the opposite direction only, the effective direction of rotation of such shaft being determined by the drive dominance thereon of one of said means over the other and such shaft being capable of changing its speed and even its direction of rotation without changing the respective direction of bias of such first and second means.

The inventive zero backlash fluid motor provides precision performance not only under abusive environmental conditions typified by applications on construction equipment, but also exceeds the exacting requirements imposed by the most advanced numerical control machine tools.

The outstanding advantage of the inventive fluid motor is the preloading of contacting force transmitting elements on rotary torque members which eliminate mechanical backlash between such elements under all operating conditions including direction reversal and output torque loading.

Other advantages of the inventive fluid motor include a design of construction which: employs rugged antifriction bearings, hydraulic fluid lubrication and rolling contact of the contacting force transmitting elements which reduce both breakout and dynamic friction forces to minimum levels; provides low internal leakage; provides a wide speed range; possessses a high torque capability; combines a minimum volume of hydraulic fluid under compression with low rotating inertia to maximize acceleration capability and fluid spring resonance; is simple and rugged with a minimum of parts assuring high reliability and long life under full load conditions; possesses flexibility for adaptation to special porting, manifolding and mounting, or a back shaft extension for instrumentation if desired; and optimizes fluid porting and mechanical balancing to minimize internal noise and vibration resulting in quiet smooth operation.

DESCRIPTION OF FIGURES

FIG. 1 is a schematic view of a preferred three gear form of zero backlash fluid motor embodying the present invention, showing the movable gears thereof and associated fluid port passages.

FIG. 2 is a view similar to FIG. 1 but reduced in scale and still more simplified and illustrating the direction of rotation of the three gears and the direction of bias of the end gears when the pressure in the left port is higher than that in the right port.

FIG. 3 is a view similar to FIG. 2 but illustrating the direction of rotation of the three gears and the direction of bias of the end gears when the pressure in the right port is higher than that in the left port.

FIG. 4 is an elevational view of the front end of the inventive fluid motor.

FIG. 5 is an elevational view of the rear end thereof.

FIG. 6 is a side elevational view thereof, as viewed from the right side of FIG. 4.

FIG. 9 is an enlarged generally horizontal sectional view thereof taken on line 9—9 of FIG. 5.

FIG. 13 is a simplified perspective schematic of a modified form of the invention employing two discrete fluid driven gear motors each including two meshing gears, and showing the direction of rotation of the output shaft when the gear motors are subjected to a differential pressure such that the pressure in one port of one gear motor is higher than the pressure in the corresponding port of the other gear motor.

FIG. 14 is a view similar to FIG. 13 but showing the output shaft rotating in the opposite direction when the differential pressure is reversed in said ports.

DESCRIPTION OF FIGURES 1–12

Figure 7:
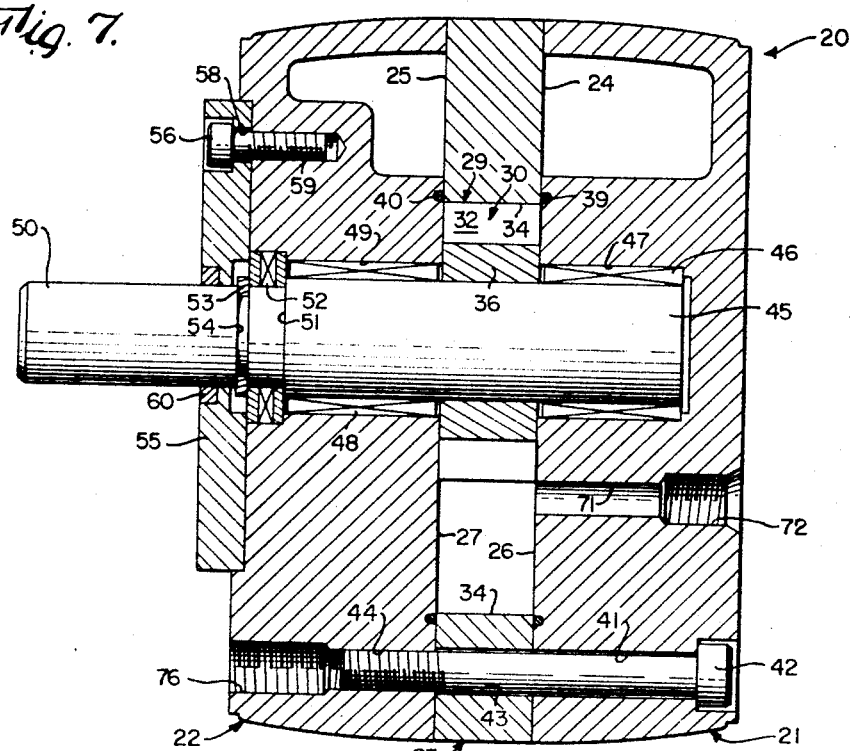
FIG. 7 is an enlarged vertical sectional view thereof taken on line 7—7 of FIG. 4.

The numeral 20 generally represents a housing which is shown as comprising a rear end member 21, a front end member 22 and an intermediate spacer member 23. These members are stacked one upon the other. The opposite side or end faces of intermediate member 23 are flat and parallel, and shown arranged vertically, the rear surface being represented by the numeral 24 and the front surface by the numeral 25. Engaging surface 24 is a flat surface 26 on rear end member 21, and engaging surface 25 is a flat surface 27 on front end member 22.

Figure 11:
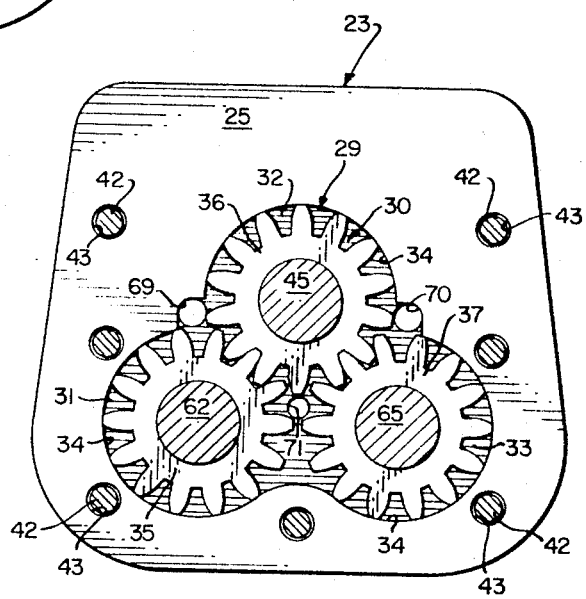
FIG. 11 is another vertical sectional view thereof taken on line 11—11 of FIG. 6.

Referring to FIG. 11, intermediate housing member 23 is shown as having an opening extending completely therethrough from face 24 to face 25, such opening being represented generally by the numeral 29. Opening 29 is closed at its ends by end faces 26 and 27 of the end housing members to provide a compartment which is represented generally by the numeral 30. This compartment is shown as having three gear chambers indicated at 31, 32 and 33. Each of these chambers is defined by a semi-cylindrical wall portion 34 of opening 29.

A first spur gear 35 is shown as rotatably arranged in gear chamber 31. A second spur gear 36 is shown as rotatably arranged in gear chamber 32. A third spur gear 37 is shown as rotatably arranged in gear chamber 33. As shown, the gears 35–37 are of the same diameter and engage in meshed tandem, with the periphery or addendum circle of each gear in close-fitting relation to semi-cylindrical wall portion 34 of the corresponding gear chamber. Each of the gears 35–37 has an axial length such that its opposing end faces have a close fit with the opposing end faces 26 and 27 of end housing members 21 and 22.

Figure 10:
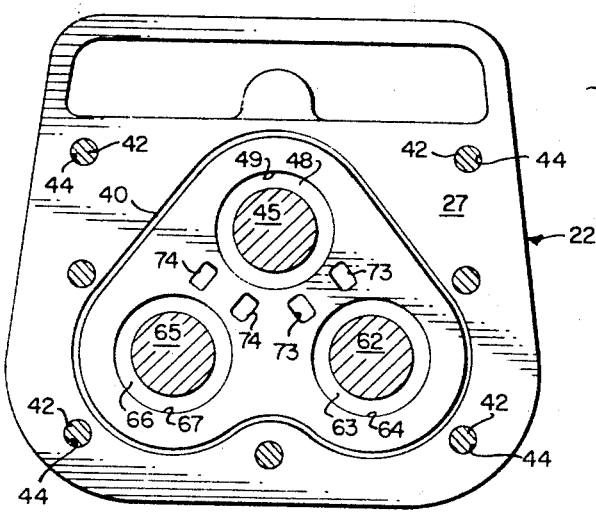
FIG. 10 is a vertical sectional view thereof taken on line 10—10 of FIG. 6.
Figure 12:
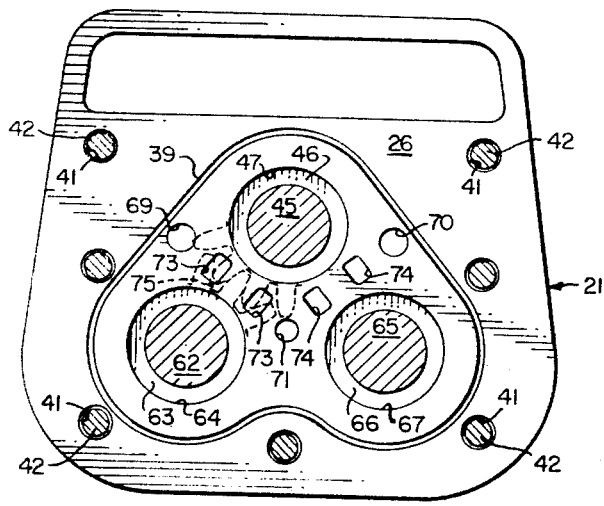
FIG. 12 is still another vertical sectional view thereof taken on line 12—12 of FIG. 6.

In order to prevent leakage outwardly from compartment 30 along the interface between housing members 21 and 23, end face 26 is shown in FIG. 12 as provided with a continuous groove of generally triangular shape which surrounds opening 29 and a continuous seal ring 39 of suitable elastomeric material such as rubber is arranged therein. A similar groove and elastomeric seal ring 40 is shown in FIG. 10 as provided in end face 27 of front housing member 22. In each case the seal ring 39 or 40 sealingly engages the opposing flat surface 24 or 25 of intermediate housing member 23.

In order to draw these opposing housing surfaces toward each other and compress the elastomeric seal rings 39 and 40, rear housing member 21 is shown as provided with a series of horizontal holes 41 extending therethrough with the outer or rear ends of these holes being counterbored to receive the heads of fastening screws 42. The shank of each screw 42 extends not only through hole 41 but also through a registered hole 43 extending completely through intermediate housing member 23. The threaded inner end portion of each such screw 42 is received in an internally threaded recess 44 provided in front housing member 22. Referring to FIG. 5, seven such screws 42 are illustrated for holding the members 21–23 together, although any suitable number may be employed, and in fact any other suitable means for removably fastening housing members 21–23 together.

Referring to FIG. 7, middle gear 36 is shown as being suitably fast to a shaft 45. This shaft is suitably journalled on opposite sides of gear 36 on suitably anti-friction bearings such as of the needle bearing type provided in recesses formed in end housing members 21 and 22. Thus the rear end of shaft 45 is journalled on bearing 46 provided in a recess 47 formed in rear housing end member 21. On the opposite side of gear 36 shaft 45 is journalled on a bearing 48 providing in a hole 49 extending through front housing end member 22. Shaft 45 is shown as having a reduced cylindrical outer portion 50 which provides an outwardly facing annular shoulder 51. Arranged against this shoulder 51 is a bi-directional anti-friction thrust bearing 52 such as of the radial needle bearing type. This bearing 52 is retained against shoulder 51 by a split ring 53 partially received in an annular groove 54 provided in shaft portion 50.

A cover plate 55 is shown secured to the front end face of housing member 22 by a series of screws 56, three such screws being illustrated in FIG. 4. The shanks of these screws pass through holes 58 provided in cover plate 55 and their inner threaded ends are received in internally threaded receses 59 formed in front housing member 22. This cover plate 55 is also shown as housing an annular shaft seal 60 of any suitable type to prevent leakage outwardly from the housing along shaft portion 50. Thrust bearing 52 is arranged between and engages opposing surfaces on cover plate 55 and front housing end member 22 and thereby positions axially shaft 45.

It will be seen that shaft 45 through its reduced end section 50 extends exteriorly of housing 20. As shown in FIG. 6, shaft portion 50 has a keyway 61 therein to adapt this shaft to be suitably coupled to a device (not shown) to be driven.

Figure 8:
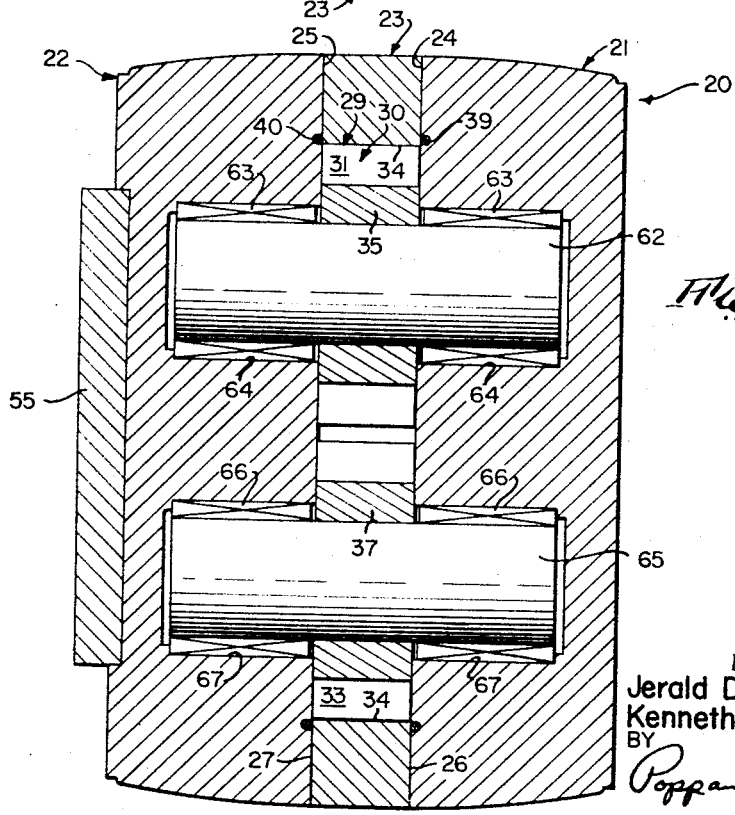
FIG. 8 is an enlarged horizontal sectional view thereof taken on line 8—8 of FIG. 5.

End gear 35 is suitably fast to an idler shaft 62 which has a portion extending laterally from each side of this gear. As shown in FIG. 8, the ends of shaft 62 are suitably journalled in anti-friction bearings such as needle bearings 63 arranged in recesses 64 provided in housing end members 21 and 22.

Similarly, gear 37 is suitably fast to an idler shaft 65 which projects laterally from opposite sides of this gear. Each such projecting end portion of shaft 65 is suitably journalled in an anti-friction bearing such as a needle bearing 66 provided in a recess 67 formed in housing end members 21 and 22.

Referring to FIGS. 9 and 11, rear housing end member 21 is shown as provided with a first passage port 69 which extends horizontally from front end face 26, of this member to the external or rear end face thereof. At its inner end this port passage 69 communicates with compartment 30 at a place between gear chambers 31 and 32 to one side of an imaginary line connecting the centers of gears 35 and 36.

Similarly, a second port passage 70 is provided horizontally through rear housing end member 21. The inner end of this passage 70 communicates with compartment 30 between gear chambers 32 and 33 to one side of an imaginary line connecting the centers of gears 36 and 37.

Considering an imaginary composite line connecting the centers of gears 35–37, it will be seen that the inner ends of port passages 69 and 70 communicate with compartment 30 above such composite centerline.

Rear housing end member 21 is shown as provided with a third port passage 71 which extends horizontally therethrough as shown in FIG. 7. The inner end of this passage 71 communicates with that portion of compartment 30 arranged on the opposite side of or below the aforementioned imaginary composite centerline for gears 35–37. Thus, port 71 is arranged on the side opposite from port 69 of those teeth of gears 35 and 36 which are sealingly engaging each other. Likewise, port 71 is arranged on the side opposite from port 70 of those teeth of gears 36 and 37 which are sealingly engaging each other.

As shown in FIGS. 7 and 9, the outer ends of each passage port 69–71 is preferably enlarged and internally threaded as indicated at 72 to facilitate the attachment of fittings (not shown) for tubing or pipes (not shown) for servicing these port passages.

Referring to FIGS. 10 and 12, each of end faces 26 and 27 is provided with a pair of bypass recesses 73, 73 arranged on opposite sides of an imaginary line connecting the centers of shafts 62 and 45. A similar pair of bypass recesses 74, 74 are provided in these faces 26 and 27 on opposite sides of an imaginary line connecting the centers of shafts 45 and 65. As illustrated in FIG. 12, the purpose of these bypass recesses 73 and 74 is to maintain communication at all times between the adjacent one of the port passages 69–71 and the root spaces indicated typically at 75 in FIG. 12 between the root circle on one gear and the addendum circle of the adjacent meshing gear on opposite sides of the particular teeth of such gears which are effecting an abutting or force transmitting engagement. This will prevent pockets of fluid from being sealed or trapped in such root spaces under conditions where the volume of such spaces will change and thus there is no tendency to compress fluid in these nonworking root spaces.

While the fluid motor may be supported in any suitable manner, its front housing end member 22 is shown in FIG. 4 as having three internally threaded horizontal recesses, each indicated at 76, adapted to receive mounting screws (not shown). Preferably, recesses 76 are continuations of certain of screw recesses 44 but having a larger diameter, as shown typically in FIG. 7.

OPERATION OF FIGURES 1–12

The operation of the form of fluid motor shown in FIGS. 1–12 is believed best understood by referring particularly to FIGS. 1–3.

As will be readily understood by those skilled in the art, port passages 69 and 70 are connected through suitable conduits (not shown) with a suitable fluid pressure and flow control source such as a flow control valve (not shown), and that port passage 71 is suitably connected to a reference pressure. An important condition of operation is that the pressure in port passage 71 is at all times during operation of the fluid motor at a pressure either below or above the operating range of pressures to which port passages 69 and 70 are subjected. More specifically, it is assumed hereinafter for the sole purpose of ease of explanation and understanding that port passages 69 and 70 severally are connected to the control ports of an electrohydraulic flow control servovalve, and that port passage 71 is connected to a fluid drain maintained at a pressure which is below that obtaining at any time in either port passage 69 or 70.

Now let it be assumed that a differential pressure is applied across port passages 69 and 70 such that the pressure in left port passage 69 is higher than that in right port passage 70. In FIG. 2, this condition is depicted by the arrows 69' and 70'. Also port passage 71 is at a return pressure represented in FIG. 2 by the line 71' maintained at a level R' at all times below the pressures 69' and 70'.

When pressure in the left port passage 69 is higher than pressure in the right port passage 70, fluid will flow toward the gears in the direction of arrow 69' and away from the gears in the direction of arrow 70', as shown in FIG. 2. Flow so entering left port passage 69 will split with half flowing around output shaft gear 36 in a clockwise direction as depicted by arrow 36', and the other half flowing around left end gear 35 in a counterclockwise direction as depicted by arrow 35'. This latter flow will proceed around right end gear 37 in a counterclockwise direction as depicted by arrow 37', and combine at right port passage 70 with the flow from middle gear 36 to produce the outflow in the direction of arrow 70'. Thus gears 35, 36 and 37 will rotate about their respective axes in the directions shown by arrows 35', 36' and 37', respectively. A clockwise torque is developed at output shaft 45 in direct proportion to the differential pressure in port passages 69' and 70', and further clockwise velocity of this shaft will occur proportional to the input flow through left port passage 69'.

Inasmuch as the absolute pressures 69' and 70' severally are always higher than pressure R', it will be seen that left end gear 35 will be biased or preloaded against middle gear 36 in a counterclockwise direction represented by arrow 35', and also that right end gear 37 will be biased or preloaded against middle gear 36 in a clockwise direction as represented by arrow 37b. This condition of bias or preload will exist independent of the output torque loading on shaft 45. In other words, for the situation depicted in FIG. 2 where pressure 69' will always be higher than pressure 70' and pressure R' will always be lower than pressure 70', the absolute values of these pressures may vary or fluctuate so that the output shaft torque will vary accordingly but the direction of bias or preload always remains the same.

Turning now to FIGS. 1 and 3, let it be assumed that the pressure in right port passage 70 has a higher pressure depicted by arrow 70" than pressure in left port passage 69 as depicted by arrow 69", with the pressure R" in port passage 71 still at a level below pressure 69" as depicted by line 71". Flow entering right port passage will split with half flowing around output shaft or middle gear 36 in a counterclockwise direction as depicted by arrow 36", and the other half flowing around right end gear 37 in a clockwise direction as depicted by arrow 37". This latter flow will proceed around left end gear 35 in a clockwise direction as depicted by arrow 35", and combine at left port passage 69 with the flow from middle gear 36 to produce the outflow in the direction of arrow 69". Thus gears 35, 36 and 37 will rotate about their respective axes in the directions shown by arrows 35", 36" and 37", respectively.

Here again, inasmuch as the absolute pressures 69" and 70" severally are always higher than pressure R", it will be seen that right end gear will be biased or preloaded against middle gear 36 in a clockwise direction represented by arrow 37", and also that left end gear will be biased or preloaded against middle gear 36 in a counterclockwise direction as represented by arrow 35b.

Comparing FIGS. 2 and 3, it will be seen that regardless of the respective rotational directions of the several gears 35–37, left end gear 35 will always be biased or preloaded in a counterclockwise direction 35' or 35b against middle gear 36, and right end gear 37 will always be biased or preloaded in a clockwise direction 37" or 37b against middle gear 36. This condition of bias or preload thus exists independent of direction of rotation or output torque loading on shaft 45.

In this manner backlash is eliminated between the contacting force transmitting elements on rotary torque members such as meshing teeth on gears.

While it is preferred to maintain the pressure R' or R" in port passage 71 at a level below the operating range through which pressures 69', 69" in left port passage 69 and pressures 70', 70" in right port passage 70 may fluctuate in order to accommodate internal leakage, it is also within the contemplation of the present inventive concept to maintain the pressure in port passage 71 at a level higher than such operating range. This will reverse the respective directions of bias or preload of end gears 35 and 37 against middle gear 36. It is only essential to the present invention that the pressure in port passage 71 is at all times maintained at a level outside only one end of the operating range through which the pressures in port passages 69 and 70 may fluctuate.

DESCRIPTION OF FIGURES 13 AND 14, INCLUDING OPERATION

In FIGS. 13 and 14 the same end result of no backlash on the toothed drive elements fast to an output shaft 80 is achieved. Instead of three gears arranged in meshed tandem, two gear motors 81 and 82 are provided. Gear motor 81 is shown in FIG. 13 as having a first gear 83 fast to output shaft 80, a second meshing gear 84 fast to an idler shaft, a first fluid port passage 85 and a second fluid port passage 86. Gear motor 82 is shown in FIG. 13 as having a first gear 88 fast to output shaft 80, a second meshing gear 89 fast to an idler shaft, a first fluid port passage 90 and a second fluid port passage 91. All four gears are shown as having the same diameter. Motors 81 and 82 may be of the conventional external or internal gear tooth type.

It is assumed in FIG. 13 that a differential pressure is applied across port passages 85 and 90 such that the pressure in port passage 85 is higher than that in port passage 90, and that the pressure R in port passages 86 and 91 is at all times below the lower operating pressure in port passage 90. As a consequence, shaft 80 and gears 83 and 88 all being fastened together rotate in a counterclockwise direction as viewed in FIG. 13, whereas each of gears 84 and 89 rotates in a clockwise direction. Since the pressure in port passage 85 is dominant over that in port passage 90, the drive on shaft 80 will be as stated and the bias or preload of gear 84 against gear 85 will be clockwise as represented by arrow 92. However, since the pressure in port passage 90 is higher than that in port passage 91, the bias or preload of gear 89 against gear 88 will be counterclockwise as represented by arrow 93, just the opposite of its present direction of rotation.

Now assume that the differential pressure in port passages 85 and 90 is reversed so that the higher pressure exists in port passage 90 and the lower pressure in port passage 85. This is depicted in FIG. 14 wherein these pressures are represented by the arrows 90' and 85'. Pressure 90' now being dominant, gear 88 will rotate in a clockwise direction as viewed in FIG. 14, thus causing output shaft 80 and also gear 83 to rotate in the same direction. The other gears 84 and 89 rotate in the opposite or counterclockwise direction. However, the respective directions 92 and 93 of bias or preload of these gears 84 and 89 against the respective gears 83 and 88 with which they mesh will remain the same because the pressures in port passages 85' and 90' are always higher than pressure R in port passages 86 and 91.

As in the case of the three gear form of the invention shown in FIGS. 1–12, the four gear form shown in FIGS. 13–14 produces a unidirectional bias or preload regardless of the direction of rotation or the output torque loading. Likewise, if the pressure in port passages 86 and 91 is at all times maintained at a level above the operating range of pressures in port passages 85 and 90, the bias directions 92 and 93 will be reversed.

We claim:
1. A zero backlash fluid motor, comprising an output shaft, first fluid driven means biasing said shaft to rotate in one direction only, and second fluid driven means biasing said shaft to rotate in the opposite direction only, the effective direction of rotation of said shaft being determined by the drive dominance thereon of one of said means over the other and said shaft being capable of changing its speed and even its direction of rotation without changing the respective directions of bias of said first and second means.

2. A fluid motor according to claim 1 wherein each of said means includes contacting force transmitting elements on rotary torque members.

3. A fluid motor according to claim 2 wherein said elements are gear teeth.

4. A zero backlash fluid motor, comprising an output shaft, a driven gear fast to said shaft, first fluid driven means biasing said shaft to rotate in one direction only and including a first drive gear meshing with said driven gear, and second fluid driven means biasing said shaft to rotate in the opposite direction only and including a second drive gear meshing with said driven gear, the effective direction of rotation of said shaft being determined by the drive dominance thereon of one of said drive gears over the other and said shaft being capable of changing its speed and even its direction of rotation without changing the respective directions of bias of said drive gears.

5. A zero backlash fluid motor, comprising a housing having a compartment including first, second and third gear chambers, a first gear in said first chamber, a second gear in said second chamber and meshing with said first gear, a third gear in said third chamber and meshing with second gear, said housing having a first fluid port communicating with said compartment between said first and second gear chambers and also having a second fluid port communicating with said compartment between said second and third chambers, and an output shaft fast to said second gear and extending exteriorly of said housing, said ports being so arranged that when a fluid differential pressure is applied thereacross and regardless of which port has the higher pressure said first gear will be caused to exert a bias on said second gear in one direction only and said third gear will be caused to exert a bias on said second gear in the opposite direction only.

6. A zero backlash fluid motor, comprising a housing having a compartment including first, second and third gear chambers and also including first, second and third fluid ports, a first gear in said first chamber, a second gear in said second chamber and meshing with said first gear, a third gear in said third chamber and meshing with said second gear, said first port communicating with a first portion of said compartment unoccupied by said first and second gears, said first portion being arranged on one side of an imaginary line connecting the centers of said first and second gears, said second port communicating with a second portion of said compartment unoccupied by said second and third gears, said second portion being arranged on one side of an imaginary line connecting the centers of said second and third gears, said third port communicating with a third portion of said compartment unoccupied by any of said gears and arranged on the opposite side of both said imaginary lines, whereby when a fluid differential pressure is applied across said first and second ports and regardless of which of such ports has the higher pressure said first gear will be caused to exert a bias on said second gear in one direction only and said third gear will be caused to exert a bias on said second gear in the opposite direction only, this being achieved when the pressure in said third port is at all times maintained at a level outside only one end of the operating range through which the pressures in said first and second ports may fluctuate.

7. A fluid motor according to claim 6 wherein said pressure in said third port is maintained at a pressure below the lowest pressure in said operating range.

8. A zero backlash fluid motor, comprising a housing including first and second end members and an intermediate spacer member, fastener means removably securing said members together, said intermediate member including an opening extending therethrough which is covered on opposite ends by said end members to provide a compartment, said opening having three semi-cylindrical wall portions, three gears arranged in meshed tandem in said opening and severally having an axial length corresponding to the thickness of said intermediate member and also severally having a close peripheral fit with said wall portions, an output shaft to which the middle one of said gears is fast and extending exteriorly of one of said end members, the other of said gears defining end gears, each of said end gears being fast to a shaft, said shafts severally being journalled in said end member on opposite sides of the corresponding one of said gears, and said housing having a first port passage leading from the exterior thereof to said compartment between said middle gear and one of said end gears and also having a second port passage leading from said exterior to said compartment between said middle gear and the other of said end gears.

9. A fluid motor according to claim 8 wherein said housing also has a third port passage leading from the exterior thereof to said compartment on the side of said gears opposite from the places where said first and second port passages communicate with said compartment.

10. A fluid motor according to claim 9 wherein said port passages are all provided in that one of said end members through which said output shaft does not extend.

11. A fluid motor according to claim 10 wherein seal means are interposed between each of the interfaces between said intermediate and end members and surround said opening at each end thereof.

12. A fluid motor according to claim 9 wherein a bi-directional axial thrust bearing is operatively interposed between said housing and said output shaft.

13. A fluid motor according to claim 9 wherein the end faces of said end members which oppose said intermediate member have recesses adjacent where the teeth of said gears engage to establish communication between an adjacent one of said port passages and root spaces between the interdigital gear teeth on opposite sides of the particular teeth effecting an abutting engagement, thereby to eliminate trapped pockets of fluid in said spaces.

14. A fluid motor according to claim 1 wherein each of said first and second means includes a gear motor.

15. A fluid motor according to claim 14 wherein each gear motor has one of its rotary members fast to said output shaft and also has two ports, one of said ports of each gear motor being connected to a reference pressure, and the other ports of said gear motors being subjected to a differential pressure, said reference pressure being maintained at all times at a level outside only one end of the operating range of said differential pressure.

References Cited

UNITED STATES PATENTS 1,937,367 11/1933 Vickers _____ 91—89 XR
3,050,009 8/1962 Lowry _____ 103—125

CARLTON R. CROYLE, *Primary Examiner.*

ALLAN D. HERRMANN, *Assistant Examiner.*

U.S. Cl. X.R.

74—409